H. KLECKLER.
TAIL SKID FOR AEROPLANES.
APPLICATION FILED APR. 16, 1917.
1,290,236.
Patented Jan. 7, 1919.
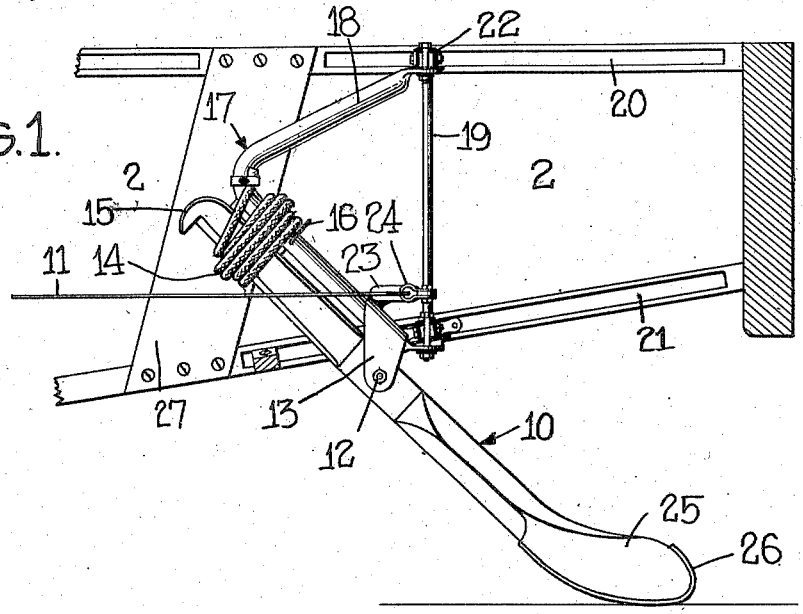
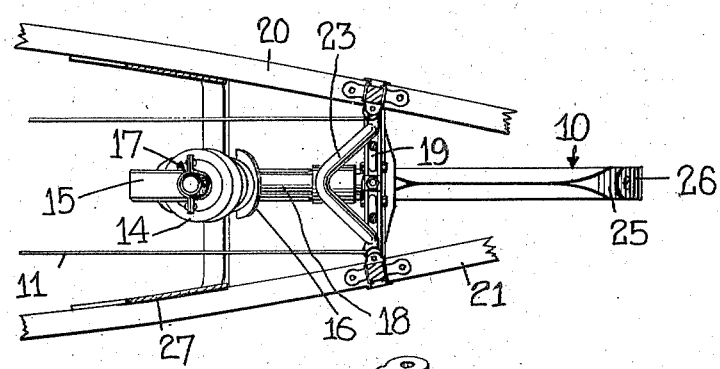
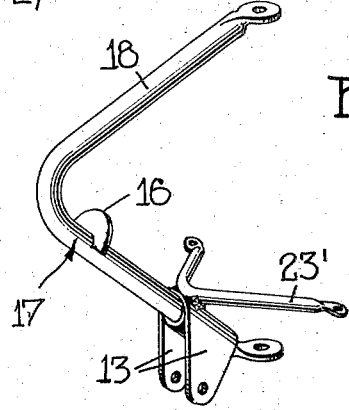
Inventor
HENRY KLECKLER.
By
John P. Tarbox
Attorney

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

TAIL-SKID FOR AEROPLANES.

1,290,236.     Specification of Letters Patent.     Patented Jan. 7, 1919.

Application filed April 16, 1917. Serial No. 162,534.

*To all whom it may concern:*

Be it known that I, HENRY KLECKLER, a citizen of the United States, residing at Buffalo, in the county of Erie and State of New York, have invented certain new and useful Improvements in Tail-Skids for Aeroplanes, of which the following is a specification.

My invention relates to tail skids for aeroplanes. This invention is characterized especially by compactness, simplicity of construction, and increased strength. Instead of the usual attenuated elastics, elastics of decreased length are used. These elastics embrace the forward upper end of the skid bar and are secured or fastened to an improved triangulated support. One of the sides of this support extends substantially vertically and is fixed with respect to the aeroplane body to serve as an axis about which the two remaining sides are movable. Said remaining sides are integrally united and equipped with down-turned ears between which the skid bar is fulcrumed. By such an arrangement movement of the skid bar in both a vertical and a horizontal plane is obtained and a two point distribution of the landing impact provided. Moreover, the movable part of the said support may or may not be coupled up with the lateral directional control surface or surfaces for steering purposes. In any event the elastics, the support and the steering parts are inclosed completely within the fuselage or body.

Of the drawings, wherein like characters of reference designate like or corresponding parts:

Figure 1 is a longitudinal sectional view of the tail end of an aeroplane fuselage illustrating the tail skid and its support or mounting in side elevation;

Fig. 2 is a section on the line 2—2 of Fig. 1, and

Fig. 3 is a perspective view of the movable portion of the skid support.

In the embodiment of the invention selected for illustration, the skid bar 10 is shown as of the steering type in that appropriate connections have been provided whereby movement of the rudder or lateral directional control surfaces (not shown) will impart to the skid bar corrresponding movement. Control leads 11 to be connected up with the usual foot bar type of control (not shown) are shown in this connection.

Intermediate its ends the skid bar 10 is fulcrumed as at 12 for vertical movement. Ears 13 integrally united with the movable part of the triangulated support serve as the skid bar fastening means. These ears are brazed or welded on the support at a point adjacent its lower extremity and at a point removed from the shock absorber elastics 14. The elastics (see Fig. 1) embrace the movable part of the triangulated support and the skid bar 10. Moreover, the elastics are quite short and in fact normally maintain the upper end of the skid bar in contiguous contact with the lower forward edge of the triangulated support. In this connection it will be noted also that the skid bar is provided at its inner upper end with an enlargement 15, and the triangulated support with an abutment 16, whereby casual displacement of the elastics 14 is prevented.

The triangular support, designated as an entirety by the numeral 17, comprises a movable part 18 and a fixed part 19. Said fixed part 19 extends substantially vertically from a point in the plane of the upper longerons 20 of the fuselage to a point in the plane of the lower longerons 21. Horizontal fuselage struts 22 interconnecting said longerons 20 and 21 support said fixed part 19. The part 18 is movable about the fixed part 19 as an axis and is so mounted with respect to said fixed part that its extremities engage said parts at points widely spaced and preferably in the vicinity of the fixed part extremities. The fixed part 19 is in the nature of V arranged or diverging metal rods and the movable part 18 is constructed of metal tubing terminally flattened and bent intermediate its ends to constitute two sides of the support 17 when considered in its entirety. A wide distribution of the landing shocks or impact is obtained by this arrangement. In other words, the impact is distributed to points in the immediate vicinity of the cross struts 22 which are effectually braced by the rods 19.

A tiller 23 of substantially V-form in a horizontal plane is brazed to the movable part 18 of the triangulated support. Its location is preferably at a point in the vicinity of the lower extremity of the triangle with the arms of the tiller extending rearwardly and laterally for termination at points in the plane of the vertical axis of the tail skid as defined by the fixed part 19. Shackles 24 are utilized for fastening the control leads 11 to said tiller extremities. The arms of the tiller extend rearwardly for increased leverage in manupulating the tail skid for steering purposes. Furthermore, the triangulated support, in its entirety, (hence the tiller 23) is inclosed in the body of the craft.

The rear outer end of the skid bar 10 is enlarged as at 25 and equipped with a wearing plate 26 of appropriate form. Said enlargement 25 provides for increased strength and the plate 26 for increased longevity of the skid. In addition, appropriate means such as the laminated or veneered strips 27 may be provided interiorly of the fuselage to prevent puncture of the fabric covering should the tail skid be laterally deflected to an unusual extent.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. A tail skid for aeroplanes including a skid bar having yielding connection with an angularly-extending support mounted to swing on a substantially vertical axis.

2. A tail skid for aeroplanes according to claim 1 characterized by the fact that the support is inclosed for the major part in the body of the aeroplane.

3. A tail skid for aeroplanes according to claim 1 characterized by the fact that the skid bar is movable with and with respect to the support.

4. A tail skid for aeroplanes according to claim 1 characterized by the fact that the support, including its axis, is of substantially triangulated form.

5. A tail skid for aeroplanes including an inclined support, a skid bar yiedingly connected with the support and inclined in the same general direction and a pivotal connection between the skid bar and support.

6. A tail skid for aeroplanes according to claim 5 characterized by the fact that the support is movable laterally with the skid bar in response to laterally directed shocks.

7. A tail skid for aeroplanes according to claim 5 characterized by the fact that the support for the major part is inclosed in the body of the aeroplane.

8. A tail skid for aeroplanes including a laterally movable support, a skid bar of a construction such that it extends substantially parallel with the support throughout a portion of its length, and spaced connections between said bar and said support comprising elastic means and the pivot means respectively.

9. A tail skid for aeroplanes comprising a pivoted laterally movable support, the major portion of said support lying at one side of its pivot axis, a skid bar, and a connection between said bar and said support.

10. The combination with an aeroplane including a fuselage, of a tail skid extended at one end into the fuselage, a support inclosed in the fuselage and mounted to swing on a substantially vertical axis, and an elastic connection between the tail skid and the movable support, the type of connection being such that it is completely inclosed whether or not it is distended.

In testimony whereof I hereunto affix my signature.

HENRY KLECKLER.